United States Patent [19]
Sylvis

[11] Patent Number: 5,712,434
[45] Date of Patent: Jan. 27, 1998

[54] METHODS AND APPARATUS FOR TESTING VALVES AND SWITCHES FOR AUTOMOTIVE TRANSMISSIONS

[76] Inventor: Russell Sylvis, 4657 Barnard St., Simi, Calif. 93063

[21] Appl. No.: 547,568

[22] Filed: Oct. 24, 1995

[51] Int. Cl.[6] ............................................. G01M 15/00
[52] U.S. Cl. .................................. 73/865.9; 73/118.1
[58] Field of Search ........................... 73/116, 117.2, 73/117.3, 118.1, 865.9

[56] References Cited

U.S. PATENT DOCUMENTS

| | | | |
|---|---|---|---|
| 3,686,954 | 8/1972 | Motl | 73/865.9 |
| 4,274,281 | 6/1981 | Hoodwin | 73/118.1 |
| 4,809,544 | 3/1989 | Magoolaghan | 73/118.1 |
| 5,060,177 | 10/1991 | Gregory et al. | 73/118.1 |
| 5,127,257 | 7/1992 | Rice | 73/865.9 |
| 5,445,016 | 8/1995 | Neigebauer | 73/118.1 |

*Primary Examiner*—George M. Dombroske
*Attorney, Agent, or Firm*—Mark P. Stone

[57] ABSTRACT

The present invention provides methods and apparatus for testing solenoid switches and force motors installed in the hydraulic system of automotive transmissions for controlling the flow of transmission fluid. Solenoid switches and force motors are tested under selectively variable electrical, air flow, and air pressure conditions, to simulate conditions experienced during normal operation in an automotive transmission. By simulating such operating conditions, the solenoid switches and force motors are more efficiently screened to avoid component failure when reinstalled in an automotive transmission. The present invention further enables numerous different size solenoids, force motors and switches to be tested by a single device.

20 Claims, 3 Drawing Sheets

METHODS AND APPARATUS FOR TESTING VALVES AND SWITCHES FOR AUTOMOTIVE TRANSMISSIONS

BACKGROUND OF THE INVENTION

The present invention is directed to methods and apparatus for testing solenoid switches, force motors, and other components provided for controlling fluid flow and fluid pressure in the hydraulic circuitry of an automotive transmission. More specifically, the present invention is directed to the testing of such components under variable operating conditions, including variable electrical actuation and de-actuation thereof and variations in air flow and air pressure, when said components are removed from an automotive transmission and prior to the reinstallation therein, such as when an automotive transmission is removed from a vehicle for repair or rebuilding thereof.

It is common knowledge that repair, replacement or rebuilding of transmissions for automotive vehicles, and particular passenger cars, is complicated, time consuming and expensive. Automotive transmissions include hydraulic circuitry enabling the vehicle transmission to shift gears at appropriate operating conditions. The shifting is accomplished by hydraulic circuitry within the automotive transmission, which regulates and controls fluid flow, fluid volume, and fluid pressure within the circuit lines to result in the appropriate shifting operations. During normal operation of the vehicle, fluid flow and fluid pressure within the hydraulic circuitry of the transmission is controlled by different switches including solenoid valves and force motors, both of which are electrically actuated and de-actuated. The basic difference between a solenoid and a force motor is that a solenoid switches between only two positions, a fully opened position in which fluid is exhausted from a line and line pressure is reduced to zero, and a fully closed position in which a line is blocked and fluid pressure is maintained at a maximum. A force motor includes switch positions intermediate between fully opened and fully closed to variably regulate fluid flow and fluid pressure within a circuit line.

The basic purpose of a solenoid in an automotive transmission is to either selectively seal a line of an hydraulic circuit to maintain fluid pressure therein at a maximum, or to open the line to exhaust fluid therefrom to decrease fluid pressure therein to zero. Shift or lock-up solenoids operate in this manner, and these components are controlled by electrical signals in the range of 3–12 volts applied to actuate the solenoid.

Generally, the flow rate of transmission oil through an hydraulic circuit of an automotive transmission controlled by a solenoid is approximately 1 gallon each five minutes. The flow rate of the transmission fluid (oil) which is fed into the hydraulic circuit is controlled by an appropriate orifice defined in the hydraulic circuitry. A properly operating controlled solenoid will exhaust fluid at the rate of approximately 1 gallon each two minutes, thereby reducing the fluid pressure in the hydraulic circuit to zero when exhausting. If, for example, the control solenoid becomes partially clogged thereby reducing the exhaust fluid flow rate, the solenoid might not exhaust a sufficient volume of oil to reduce the fluid pressure in the hydraulic circuit to zero pounds per square inch (psi) since the fluid flow exhaust rate is less than the rate at which fluid is flowing and being fed into the hydraulic circuit. If the pressure within the circuit is not decreased to substantially zero within the appropriate time period, it is likely that a shift or lock-up will not occur, thereby adversely affecting the operation of the automotive transmission. The flow rates discussed herein are intended to be exemplary, and different circuits may have different input and exhaust fluid flow rates and fluid flow volume.

Cross-leaks in the valve body of an automotive transmission may cause the hydraulic circuitry of the transmission to flood with a heavier volume of oil than intended during normal operation. A properly operating control solenoid cannot exhaust a sufficient quantity of the flooded oil at a sufficiently high fluid flow rate to reduce the hydraulic fluid pressure within the circuit to zero. Although this flooded condition will adversely affect the operation of the automotive transmission, it is nonetheless not a problem caused by a defective solenoid switch. Appropriate testing of a solenoid to determine if it is properly operating will eliminate solenoid defect as a cause of the failure of the hydraulic system to properly exhaust oil, thereby providing a mechanic with an indication to check for a different cause of the malfunction.

The above discussion has been directed to the operation of a control solenoid in an exhausting mode. Similarly, solenoid failure can occur in its pressure mode of operation if the solenoid switch fails to properly seal an hydraulic circuit. The failure to adequately seal the circuit will affect the fluid pressure within the circuit, which may not increase to the intended level during the appropriate time period as a result of unintended exhausting resulting from the incomplete seal. The failure of the solenoid during this mode of operation will also adversely affect the proper shifting procedure during normal operation of the automotive transmission. Moreover, testing of a solenoid to determine if it is adequately sealing an hydraulic circuit can eliminate solenoid defect as a cause of the failure of an hydraulic circuit to maintain maximum line pressure, or to achieve maximum line pressure within the appropriate time period. This will enable a mechanic to search for a different cause for the failure.

A force motor (sometimes referred to as an EPC) is a component which is also provided in the hydraulic circuitry of an automotive transmission to regulate the fluid pressure and fluid flow within the circuit. The force motor, which selectively and variably regulates fluid pressure within an hydraulic circuit from zero to a desired maximum predetermined fluid pressure, is controlled by varying current flow applied thereto in the form of a pulse width, duty cycle, or by varying resistance to ground. A force motor is used in the hydraulic system for pressure regulation and for some variable lock-ups.

Line control solenoids can be fed orificed oil (as discussed above) to control the volume and flow rate of the feed of oil into the hydraulic circuitry such that it is less than the quantity and flow rate of oil flowing through the flow line, or a line control solenoid can be directly fed with full line oil pressure. The primary difference between a force motor and a solenoid is that a force motor includes means for regulating the volume of fluid and the flow rate thereof in a variable manner, while a solenoid is either "on" or "off", thereby permitting only full fluid flow or no fluid flow therethrough. A force motor has lower electrical resistance (approximately 4–5 ohms) than a line control solenoid, since a computer controls variable current flow applied to the force motor to vary its pressure regulating position. A solenoid has approximately 15–30 ohms of resistance, and no means are provided for regulating the electrical current applied to the solenoid.

A known device for "bench testing" solenoid switches removed from an automotive transmission is sold under the name "SMARTESTER". This known device has several disadvantages. It includes a probe having a rubber tip which fits into only selected size solenoids, and therefore does not have the capability of testing a wide variety of different size solenoids. Moreover, the known device indiscriminately applies pressurized air to a solenoid being tested, but does not control fluid flow and does not test for complete discharge (exhaust) to determine if the solenoid being tested is capable of reducing line pressure to zero when installed in the automotive transmission. The known device is also capable of providing only a 12 volt electrical signal to actuate a solenoid being bench tested, and does not test the solenoid at any other applied voltage (or electrical current) although other voltages (and electrical currents) may be encountered during operation of the solenoid when installed in the automotive transmission of a vehicle.

It is the primary object of the present invention to provide improved method and apparatus for "bench-testing" solenoids and force motors in the hydraulic circuitry of automotive transmissions, when these components are removed from the automotive transmission and prior to re-installation therein in conjunction with a transmission repair or rebuilding procedure. The improvements provided by the present invention include 1). providing a single device with the capability of testing numerous different size switches; 2). providing a device having the capability of "bench testing" the operation of a switch under varying fluid pressure conditions simulated by the variable application of pressurized gas (air); 3). providing a device including means for orificing the feeding of pressurized gas (air) into a switch being "bench-tested" for testing under different rates of fluid flow and volume conditions to determine if the switch will properly operate to exhaust fluid to reduce line pressure to zero at the desired flow rate, and to determine if the switch will properly seal by blocking fluid flow therethough to result in a desired increase in line pressure over an appropriate time period; 4). providing means for testing the actuation and de-actuation of the switch by applying variable voltage and electrical current to simulate conditions encountered during normal operation of the automotive transmission of a vehicle; and 5). providing a device including means for applying only a standard 12 volt signal to the switch being bench tested, in addition to the separate means for applying variable electrical current and voltage to the switch being tested.

The improved methods and apparatus in accordance with the present invention enable a wide variety of different switches to be bench tested by a single testing device, and further provide means for bench testing a switch during selectively variable applied pressure, selectively variable volume or quantity of fluid applied, selectively variable flow rate of gas (air) fed into the device to simulate actual operating oil (fluid) flow and volume conditions encountered within the hydraulic circuit of the automotive transmission during actual operation, and selectively varying applied electrical signals to actuate and de-actuate the switch to simulate actual operating conditions, in addition to separate means for applying a standard 12 volt electrical signal to the pressure switch.

Other objects and advantages of the improvement provided by the present invention will become apparent to those skilled in the art from the following discussion of the invention in conjunction with the drawings.

SUMMARY OF THE INVENTION

The present invention provides improved method and apparatus for "bench testing" switches of an hydraulic circuit of an automotive transmission under conditions simulating those encountered during actual operation of a vehicle. The switches include solenoids and force motors which are provided in the hydraulic circuitry of an automotive transmission for controlling the volume of fluid flowing through a circuit and controlling the fluid flow rate therethrough. The solenoids and force motors are removed from the hydraulic circuitry and tested prior to reinstallation in the automotive transmission when the transmission is removed from a vehicle for repair or rebuilding.

The improvements of the present invention include the provision in a single device of means for bench testing all different size solenoids and other switch components removed from an automotive transmission. The device includes a relatively large number of different size, removably plugged openings for receiving different size switches to be tested. The device also includes adaptor means for testing switch components of sizes which differ from any of the openings defined in the test device. As new transmissions are developed, more adapters will be produced to accommodate the new transmissions.

The device further includes means for applying pressurized gas (air) into the housing of the device for testing the switch component received within the housing. The means for applying pressurized gas includes an input gate valve coupled to a pressure regulator and a pressure gauge for controlling and monitoring the applied pressure provided by a source of pressurized air selectively coupled thereto. A plurality of orifices are provided at the input end of the housing to selectively control the volume of pressurized gas applied to the housing for testing the switch component received within the housing. The pressurized air simulates oil pressure and flow in the hydraulic circuit of the automotive transmission controlled by the switch component when the switch component is in its operating position during actual operation of the automotive transmission.

The method and apparatus of the present invention provides means for selectively varying the air pressure applied to the housing for testing the switch component received within the housing at different pressure values over a wide range of varying pressure as is encountered by the switch component during actual operation in the automotive transmission.

The method and apparatus of the present invention further provides orifice means operatively associated with the means for applying pressurized air to the housing for controlling both the volume of pressurized air applied to the switch component, and the flow rate of pressurized air controlled by the switch component. In this manner, the switch component cab be bench tested under conditions simulating actual operation within the automotive transmission to determine if the switch component is properly operating to control volume and flow rate of hydraulic fluid for proper exhausting of the hydraulic circuit and for proper closing of the hydraulic circuit to obtain maximum line pressure.

In a still further aspect of the present invention, means are provided for varying the electrical current and voltage applied to the switch component to test for proper actuation and de-actuation of the switch in response to the applied electrical signals. The switch components, such as the control solenoids and force motors in the hydraulic circuitry of automotive transmissions, are actuated at different values of applied voltage and electrical current, and are not exclusively controlled by the application of a standard 12 volt DC signal. The application of infinitely variable electrical current and voltage signals within a predetermined range enables the switch component to be bench tested under conditions simulating the application of several different electrical signals applied to the switch components during actual operation in the hydraulic circuitry of an automotive transmission. The device of the present invention further includes separate means for applying a standard 12 volt electrical signal to the switch component being tested, in addition to the aforementioned means for applying variable electrical current and voltage signals.

The improvements provided by the method and apparatus of the present invention enable a switch component of an automotive transmission to be bench tested under conditions simulating actual operation in the hydraulic circuitry even though the component is removed from the automotive transmission. The present invention permits all sized switch components to be tested by a single device. Testing of the component occurs under a wide variety of variable conditions encountered during actual operation thereof in the hydraulic circuitry of an automotive transmission. The test device includes means for selectively varying the pressure of gas (air) applied to the switch component being tested to simulate varying oil pressure encountered during actual operating conditions; means for selective variation of the volume (quantity) and fluid flow rate of pressurized gas (air) applied to the switch component being tested to simulate exhausting and maximum oil pressure conditions controlled by the switch component during actual operation during the hydraulic circuitry of an automotive transmission; and means for selective infinite variation of electrical parameters (voltage and electrical current) applied to the switch component being tested to simulate actual operating conditions for actuating and de-actuating the switch component.

Further features and improvements of the present invention will become apparent to those skilled in the art from the following discussion of the invention in conjunction with the drawings.

DESCRIPTION OF THE BEST MODES FOR CARRYING OUT THE INVENTION

Figure 1:
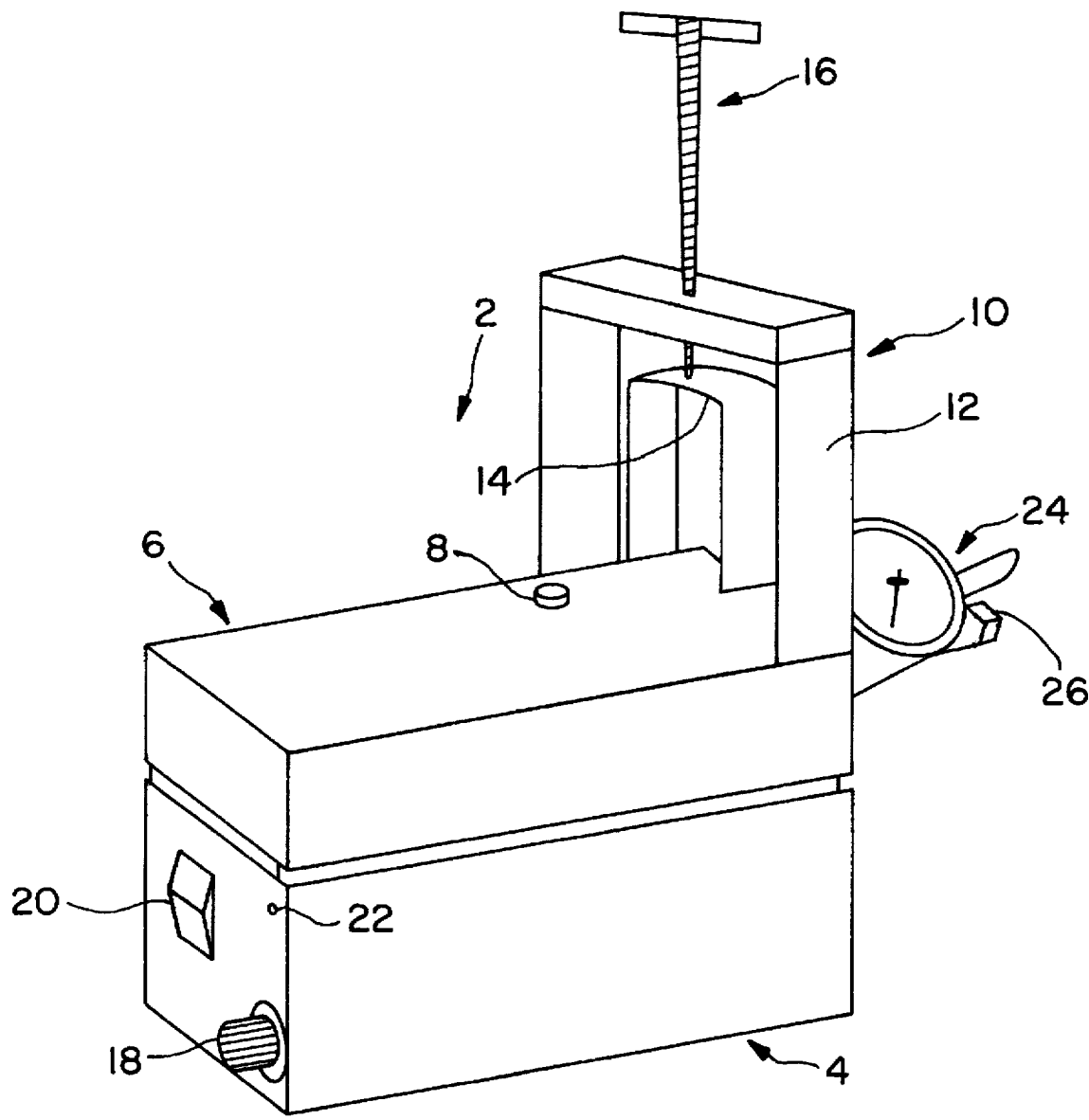
FIG. 1 of the drawing illustrates a perspective view of a testing device in accordance with the present invention illustrating controls provided on a front end of the device, a pressure gauge, pressure regulator and compressed air coupling provided on a rear end of the device, and a clamp provided on the top of the device.
Figure 2:
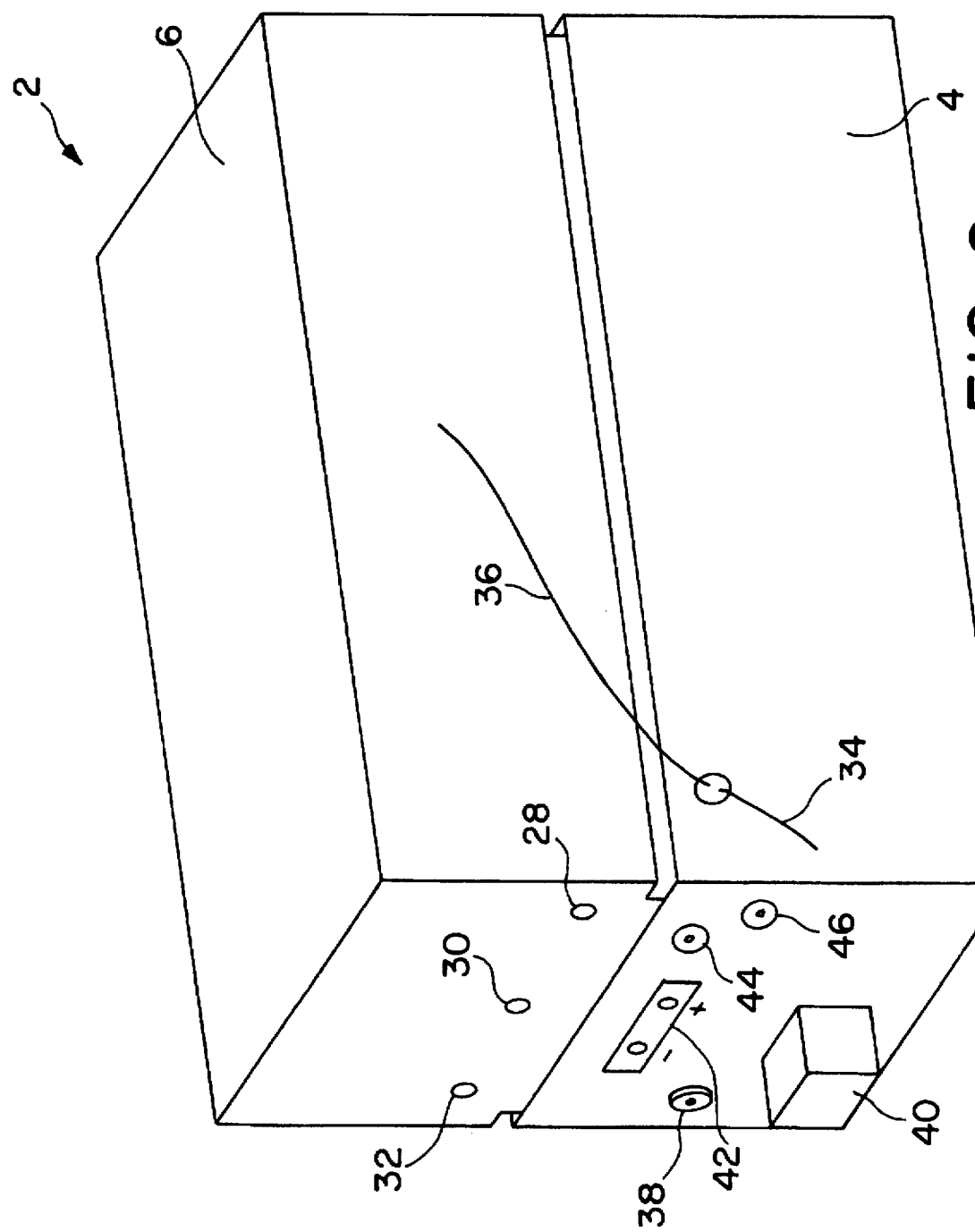
FIG. 2 of the drawing illustrates the rear end of the device of FIG. 1, in which the pressure gauge, pressure regulator and compressed air coupling are removed, to illustrate other components provided on the rear end of the device.
Figure 3:
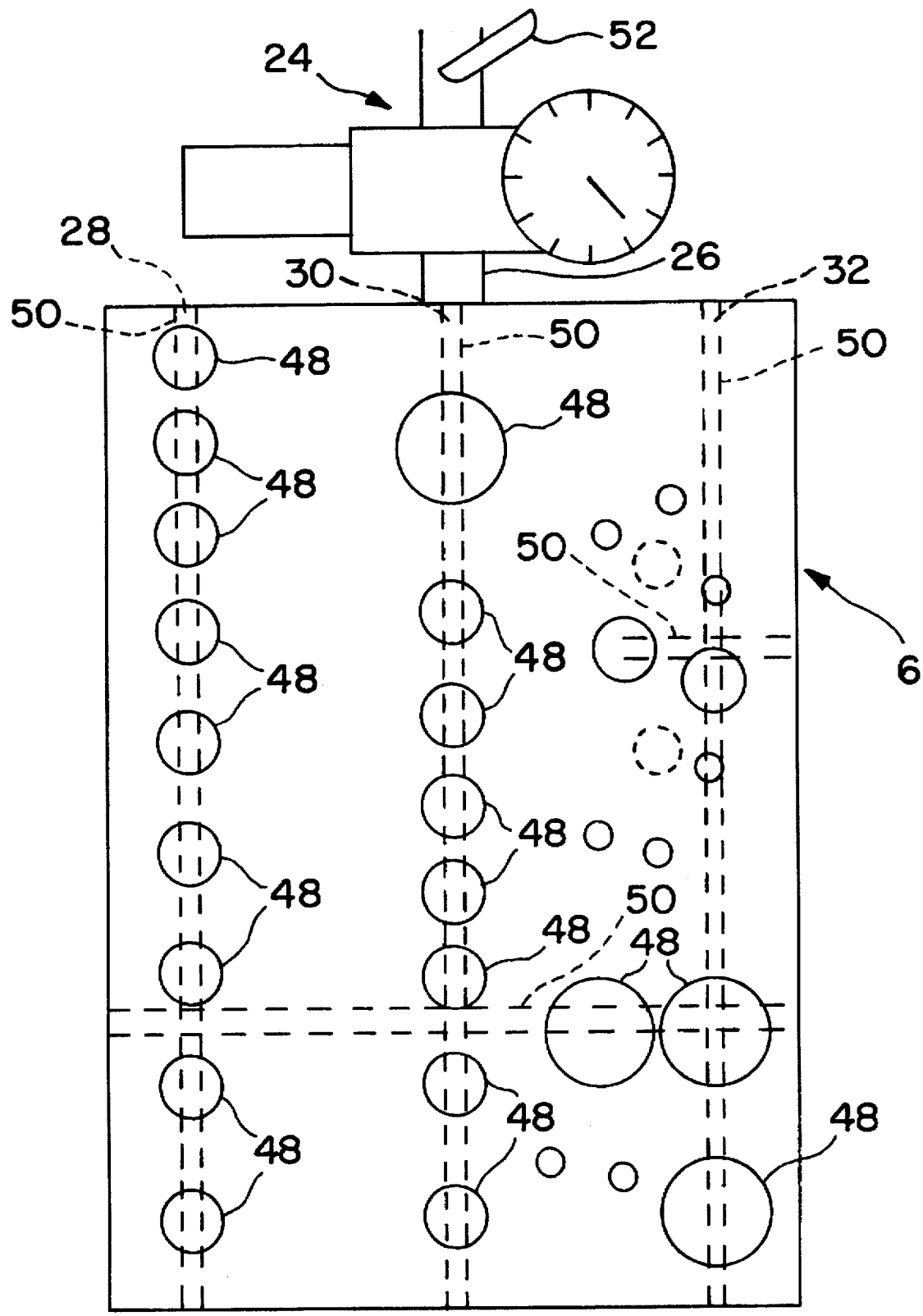
FIG. 3 is a top view of the testing device of the present invention, in section, illustrating different sized openings defined for receiving different size switch components to be tested, and further illustrating fluid flow passageways defined within the housing for coupling the different openings to the source of pressurized air applied to the housing.

FIGS. 1–3 illustrate the preferred embodiment of a device for testing switches of the hydraulic circuitry of an automotive transmission in accordance with the methods and apparatus of the present invention. Referring first to FIG. 1, the testing device includes a housing generally illustrated by the reference numeral 2 including a lower portion designated by reference numeral 4 comprising an electrical power supply, and an upper portion designated by reference numeral 6 comprising a pressure manifold. A pressure switch testing light, designated by reference numeral 8, is installed on the top surface of the housing. A hold down clamp, generally designated by reference numeral 10, includes an inverted "U-shaped" supporting element 12 fixedly mounted atop the housing, and an adjustable clamp element generally designated by reference numeral 14 which is movable relative to the fixed support element 12 in a generally vertical direction by an appropriately threaded "T-shaped" handle element 16 mounted thereto. The hold-down clamp is provided to removably secure solenoids to the pressure manifold 6 of the housing 2. FIG. 1 further illustrates that the front end of the lower portion 4 of the housing includes a current signal control knob designated by reference numeral 18, an on-off switch generally designated by reference numeral 20 for actuating and de-actuating the power supply, and an on-off indicator light generally designated by reference numeral 22 for providing a visual indication when the power supply is on. FIG. 1 also illustrates that the rear end of the upper portion 6 of the housing includes a pressure gauge and pressure regulator, generally designated by reference numeral 24, operatively associated with a coupling generally designated as reference numeral 26, for supplying compressed gas (air) to be fed into the upper portion 6 of the housing through a suitably sized orifice. The pressure regulator and pressure gauge, and its operative relationship with a source of compressed air connectable to the inlet coupling line 26, is further illustrated and discussed with respect to FIG. 3 of the drawing.

FIG. 2 of the drawing illustrates the device of FIG. 1, more clearly illustrating the rear end of the housing 2. The hold down clamp 10, the pressure gauge and regulator 24, and the compressed air inlet coupling 26, have been removed to more clearly illustrate other components on the rear end of the housing. The upper portion 6 of the housing 2 is a pressure manifold which defines three different sized orifice adapter openings designated by reference numerals 28, 30 and 32 for coupling the pressure regulator and the inlet compressed air feed line 26 to the upper portion of the housing for applying compressed gas (air) for bench testing switch components in the housing, as will be discussed herein. Different sized orifices, which are separate couplings selectively used to control the volume of compressed air fed into the housing, are removably received (preferably by screwing) in the inlet feed line 26 to adjust the diameter of that line. As illustrated by FIG. 2, inlet line 26 (into which the appropriate sized orifice coupling has been mounted), is coupled to the housing through central orifice adapter opening 30, while the remaining orifice adapter openings 28 and 32 are sealed by plugs. As will be discussed herein, the quantity or volume of compressed air fed into the upper portion 6 of the housing through the orifice adapter opening 30 is selectively controlled by the size of the orifice coupling received in the inlet line 26 connected between the opening 30 and the source of compressed air. In this manner, the pressure regulator controls the applied pressure, and the selected orifice controls the volume of compressed air and the flow rate of the applied compressed air into the housing.

Still referring to FIG. 2 of the drawing, reference numerals 34 and 36 designate indicator light wires which are electrically coupled to the pressure switch testing light 8 shown in FIG. 1, and placed in series with the power supply. The pressure switch testing light 8, and the related circuitry provided by wires 34 and 36 and the power supply, are employed to test switches in the hydraulic circuitry of an automotive transmission which are actuated by applied fluid pressure and make or break an output electrical signal in response to applied hydraulic pressure. In this mode of operation, the wire from the positive lead of electrical terminal 42 is connected to the jack 44 to apply a constant voltage signal (e.g., 12 volts D.C.) to the pressure actuated switch being tested.

A circuit breaker 38 for the electrical circuit between the power supply and the switch component being tested is provided on the rear end of the lower housing portion 4 holding the electrical power supply. The rear end of the power supply 4 further includes a transistor and heat sink generally designated by the reference numeral 40, an electrical terminal designated by reference numeral 42, and upper and lower electrical jacks designated respectively by reference numerals 44 and 46, which are internally connected to the positive contact of the electrical terminal 42. The upper jack 44 applies a constant 12 volt DC signal to the switch component being tested when the positive electrical lead is plugged into it, as discussed above with reference to the testing of pressure actuated switches. A variable voltage and electrical current signal is applied to a switch component being tested when the electrical lead is connected to the electrical jack 46. The variable voltage and electrical current signal applied to the switch component is selected and adjusted by turning the current signal control knob 18 on the front end of the power supply 4, as illustrated in FIG. 1. The transistor and heat sink 40 are provided for permitting control of the variations in the electrical current applied to the switch component being tested when the positive electrical lead of the electrical terminal is connected to the variable electrical jack 46.

Referring now to FIG. 3, this drawing illustrates a top plan view, partially in section, of the testing device illustrated by FIGS. 1 and 2. The top section 6 of the housing 2 includes a plurality of different size, removably plugged openings, generally designated by reference numeral 48. The openings are coupled in air flow relationship by a plurality of interconnected lines 50 to the orifice opening 30 (See also FIG. 2) for supplying pressurized air into the housing section 6 through the pressure regulator 24 and the associated inlet line 26. Orifice openings 28 and 32, which are not being used, remain on the bench. A gate valve 52 is provided for controlling the flow of pressurized air from an appropriate source of compressed air to which the inlet feed line 26 is coupled. The pressure regulator provides means for controlling variable pressure applied to the upper housing section 6 and through the interconnected lines 50 for testing an hydraulic switch component received in one of the openings 48. The orifice openings 28, 30 and 32 provide means for selecting and controlling the volume or quantity of compressed air and the flow rate of compressed air applied through the lines 50 to a switch component received in one of the openings 48 within the housing.

The openings 48 are normally plugged to provide a seal from atmospheric pressure. The plugs are removable from the openings 48 to receive switch components (e.g., solenoids, force motors) to be tested therein. The different size openings are provided to accommodate different size switch components to be tested by the single testing device, and adaptors may also be provided to accommodate different size switch components which do not exactly correspond to any of the different size openings 48. When a switch component is to be tested, the appropriate opening 48 is selected, the plug is removed therefrom, and the switch component is received in the selected opening to be coupled to the compressed air introduced into the upper housing 6 by the inlet line 26 and the interconnected lines 50 within the upper housing section 6. In this manner, the switch to be tested is subject to variations in applied pressure by the pressure regulator, and variations in the volume or quantity of compressed air flowing therethrough and variations in the flow rate of compressed air applied to the switch component by selecting the appropriate orifice opening to which the inlet line 26 is coupled. The remaining openings 48, other than the opening in which the switch component is received, remain plugged so that the upper housing section 6 is sealed from atmospheric pressure. The switch component received in an opening 48 is also electrically coupled to the power supply and electrical control means for applying either a constant electrical signal or a variable electrical signal to the switch component being tested to determine the responsiveness of the switch to electrical signals applied to actuate and de-actuate the switch. A variable electrical signal is applied to the switch by plugging positive wire into the variable electrical jack 46 (FIG. 2) and varying and controlling the applied electrical signal by turning control knob 18 (FIG. 1). A constant electrical signal (e.g. 12 volts DC) is applied to the switch being tested by plugging the positive wire into the jack 44.

In operation of the testing device illustrated by FIGS. 1–3, the switch component to be tested (e.g. solenoid, force motor) is inserted into the appropriate size opening 48 in the upper housing 6 by removing the plug sealing the selected opening. In the event that the switch component does not fit into any of the openings 48, an appropriate adapter is provided to enable the switch component to be received within one of the openings in sealing relationship therein. Thereafter, the appropriate coupling is made between a selected one of the orifice adapter openings 28, 30 and 32 defined in the rear end of the upper housing section 6, and the compressed air inlet feed line 26 (and the operatively associated pressure gauge and regulator 24). The appropriate orifice coupling is selected based upon the volume and flow rate of compressed air desired to be applied to test the switch under simulated operating conditions, and the orifice is removably inserted into the inlet line 26, preferably by screwing. The compressed air inlet line 26 feeds compressed air into the selected orifice adapter opening (28, 30 or 32) in the upper housing portion 6 through the orifice coupling received in the inlet line 26, from a source of compressed air through the gate valve 52 and the pressure regulator and pressure gauge 24. The hold-down clamp is actuated by rotating the threaded handle 16 to lower the "U-shaped" clamping member for securing the solenoid being tested to the pressure manifold 6. The positive wire from the electrical terminal 42 is internally connected to the jack 46 for applying a variable electrical signal to the switch component being tested by the device. The applied electrical current is varied by control knob 18 through a range of between substantially 10 milliamps—2 amps for varying the voltage applied to the switch component being tested in a range of between substantially 0 volts—14 volts. As previously noted herein, solenoid switches are generally actuated by voltage signals in the range of 3–12 volts, depending upon the specific type of solenoid being tested.

The switch component to be tested is received in sealing relationship in one of the openings 48, either directly or with the aid of an appropriate adaptor. Pressurized air is applied to the switch component in the opening 48 through the compressed air inlet feed line 26, and the applied pressure level is controlled by the pressure regulator 24. The compressed air inlet line 26 is selectively and removably coupled to one of three orifice openings orifices 28, 30 or 32 defined in the rear end of upper housing section 6. The appropriate orifice is selected to correspond to the specific type of switch being tested so that the orifice feed of the pressurized air simulates the volume and flow rate of fluid applied to the switch as is encountered by the switch during actual operating conditions in an automotive transmission. Thus, the selection of the appropriate orifice opening controls both the volume and flow rate of the compressed air to the switch component being tested. The pressure regulator 24 controls the level of air pressure applied to the switch component, independent from the control of the volume of air and the fluid flow rate of air by the selected orifice coupling which is removably received in the inlet line 26. The pressure regulator 24 preferably includes means for varying the pressure of the applied compressed air in a range from substantially 0 psi to 150 psi.

After the desired level of air pressure has been applied to the switch component being tested, and the compressed air has been orifice fed through the appropriate orifice opening in the upper section of the housing to provide the desired volume and flow rate of the pressurized air, the application of pressurized air is connected by opening the gate valve 52. The on-off switch 20 is actuated to turn on the power supply, and the current signal control knob 18 is turned to vary the electrical current applied to the switch component. The output pressure at the pressure gauge is monitored as the electrical current signal is varied to determine if the switch is correctly operating hydraulically and electrically. If the switch being tested is an electrically actuated control solenoid, applied air pressure will seal and exhaust as electrical current is first applied through the solenoid windings, and thereafter discontinued for electrically actuating and de-actuating the solenoid switch. Force motors are tested in the same manner as the control solenoids, except force motors are actuated and de-actuated in a variable manner so that the pressure increase and decrease characteristics can be observed on a pressure gauge.

Preferably, the output pressure of a force motor being tested is monitored by a separate pressure gauge provided at the force motor output. This separate pressure gauge at the output of the force motor preferably is removably mounted to an opening in an adaptor for the force motor received in the appropriate opening 48 of the testing device. In the alternative, if no separate pressure gauge is provided to individually monitor force motor output pressure, the permanent pressure gauge operatively associated with the pressure regulator 24 can be employed to monitor the pressure of the compressed air applied to the upper housing 6. If the switch is properly operating, output air pressure will rise to a maximum as the switch is turned on, and decrease to a minimum as the switch is turned off (and the circuit exhausts the air). Simultaneously with the monitoring of the maximum and minimum outputs of the control solenoid being tested, the amperage draw of the solenoid is also checked at maximum and minimum pressure output to determine if the electrical operation of the solenoid is proper and within permissible limits. Thus, the testing device of the present invention enables a solenoid or other electrically actuated switch to be tested for proper operation under both varying electrical and pneumatic conditions.

It is apparent from the above discussion that the present invention provides methods and apparatus for bench testing switch components removed from the hydraulic circuitry of automotive transmissions, including 1). means for selectively varying the level of air pressure applied to the switch for simulating actual operating conditions encountered in the hydraulic circuitry of an automotive transmission, 2). means for selecting the appropriate volume of pressurized air and flow rate of pressurized air applied to the switch for simulating operating conditions encountered by the switch when installed in the hydraulic circuitry of an automotive transmission, and 3). means for selectively varying the electrical current applied to the switch and simultaneously monitoring the output pressure to simulate electrical actuation and de-actuation of the switch under actual operating conditions of the switch in an automotive transmission.

The description of the preferred embodiments of the invention discussed herein is intended to be illustrative only, and not restrictive of the scope of the invention, that scope being defined by the following claims and all equivalents thereto.

I claim:

1. An apparatus for testing switches removed from an hydraulic circuit of an automotive transmission, said apparatus comprising:

a housing including means for coupling said housing to a source of compressed gas;

a plurality of different sized openings defined within said housing, each of said openings adapted to receive therein a different size switch removed from said automotive transmission to be tested by said apparatus; and means for removably sealing each of said plurality of openings when a switch to be tested is not received in said openings.

2. The apparatus as claimed in claim 2, further including adapter means for selectively adjusting the size of at least one of said openings within said housing for receiving a switch to be tested therein.

3. The apparatus as claimed in claim 1 wherein said openings defined in said housing are sealed by a plurality of plugs removably received within said plurality of openings in said housing, said plugs corresponding in size to each of said respective openings defined in said housing, said plugs being selectively removable from said openings when a switch to be tested is received in one of said openings.

4. The apparatus as claimed in claim 1 further including means for selectively controlling the volume of compressed gas applied to said housing, said means including orifice means operatively associated with said means for coupling said housing to said source of compressed gas.

5. The apparatus as claimed in claim 4 further including means for selectively controlling the pressure of said compressed gas supplied to said housing, said means for controlling said pressure including a pressure regulator coupled between said source of compressed gas and said housing.

6. The apparatus as claimed in claim 1 further including means for selectively applying an electrical signal to a switch received in one of said openings in said housing for testing the response of said switch to electrical actuation and de-actuation.

7. The apparatus as claimed in claim 6 further including means for selectively varying said electrical signal applied to said switch in said opening.

8. The apparatus as claimed in claim 6 wherein said means for providing said electrical signal includes means for applying a constant electrical signal to said switch being tested such that the response of a pressure-actuated type switch can be monitored by said apparatus.

9. The apparatus as claimed in claim 1 including means for monitoring the output pressure at each of said plurality of openings defined in said housing.

10. The apparatus as claimed in claim 1 further including a pressure gauge operatively associated with said source of compressed gas coupled to said housing, said pressure gauge adapted for monitoring the output pressure of a switch received within one of said openings in said housing.

11. An apparatus for testing switches removed from an hydraulic circuit of an automotive transmission, said apparatus comprising:

a housing including at least one opening for removably receiving therein at least one switch removed from said hydraulic circuit of said automotive transmission;

means for selectively supplying pressurized gas to said opening in said housing for applying said pressurized gas to said switch received within said opening; and means for selectively controlling the volume of said pressurized gas applied to said opening in said housing for testing said switch under conditions simulating actual operating conditions in said automotive transmission.

12. The apparatus as claimed in claim 11 wherein said means for selectively controlling said volume of pressurized gas applied to said opening in said housing includes orifice means operatively associated with said means for selectively supplying pressurized gas.

13. The device as claimed in claim 12 further including means for selectively controlling the pressure of said gas applied to said housing from said source of pressurized gas.

14. The apparatus as claimed in claim 13 wherein said means for selectively controlling the pressure of said gas includes a pressure regulator coupled to an inlet line disposed between said housing and said source of pressurized gas.

15. The apparatus as claimed in claim 14 wherein said orifice means is removably received within said inlet line connecting said source of pressurized gas to said housing; wherein the pressure of said gas applied to said opening in said housing receiving said switch being tested, the volume of said gas applied to said opening in said housing receiving said switch being tested, and the flow rate of said gas applied to said opening in said housing receiving said switch being tested, are each selectively variable to simulate actual operating conditions in said automotive transmission.

16. The apparatus as claimed in claim 15 further including means for selectively applying an electrical signal to said switch received in said opening in said housing, means for varying said electrical signal applied to said switch in said housing, and means for monitoring gas pressure at the output of said switch received within said opening in said housing.

17. An apparatus for testing a switch removed from an hydraulic circuit of an automatic transmission, said apparatus including:

a housing defining at least one opening for removably receiving therein at least one switch removed from said automotive transmission to be tested;

means for applying a pressurized gas to a switch in said at least one opening;

means for selectively applying an electrical signal to said switch received within said opening in said housing; and means for monitoring output gas pressure at said switch in response to the application of said electrical signal thereto.

18. The apparatus as claimed in claim 17 further including means for varying said electrical signal applied to said switch received in said opening in said housing for monitoring said output gas pressure at said switch during the application of different electrical signals.

19. The apparatus as claimed in claim 17 including separate means for selectively applying a constant electrical signal to said switch in said opening in said housing.

20. The apparatus as claimed in claim 17 further including means for selectively controlling the volume, flow rate and pressure of said gas applied to said switch in said opening in said housing for testing said switch under operating conditions simulating those encountered by said switch in an automotive transmission.

\* \* \* \* \*